(12) United States Patent
Seino

(10) Patent No.: US 6,853,757 B2
(45) Date of Patent: Feb. 8, 2005

(54) ARRANGEMENT METHOD OF METAL ELECTRODE AND TRANSPARENT ELECTRODE IN OPTICAL WAVEGUIDE DEVICE AND OPTICAL MODULATOR USING THE OPTICAL WAVEGUIDE

(75) Inventor: Minoru Seino, Atsugi (JP)

(73) Assignee: Corlux Corporation, Fremont, CA (US)

( * ) Notice: Subject to any disclaimer, the term of this patent is extended or adjusted under 35 U.S.C. 154(b) by 65 days.

(21) Appl. No.: 10/201,433

(22) Filed: Jul. 23, 2002

(65) Prior Publication Data

US 2003/0053730 A1 Mar. 20, 2003

(30) Foreign Application Priority Data

Jul. 25, 2001 (JP) ........................................ 2001-224839

(51) Int. Cl.[7] .............................................. G02F 1/035
(52) U.S. Cl. ................................................ 385/2; 385/8
(58) Field of Search ................................ 385/1, 2, 4, 8, 385/9, 39, 40; 359/237, 244, 245, 295, 299, 315

(56) References Cited

U.S. PATENT DOCUMENTS

| 5,074,631 | A | * | 12/1991 | Hamano et al. ............... 385/3 |
| 5,138,480 | A | * | 8/1992 | Dolfi et al. ................. 359/251 |
| 5,153,934 | A | * | 10/1992 | Okayama et al. ............. 385/40 |
| 5,185,830 | A | * | 2/1993 | Nishimoto .................... 385/41 |
| 5,214,724 | A | * | 5/1993 | Seino et al. .................... 385/2 |
| 5,502,780 | A | * | 3/1996 | Rangaraj ........................ 385/3 |
| 5,895,742 | A | * | 4/1999 | Lin ............................. 430/321 |
| 6,069,729 | A | * | 5/2000 | Gill et al. ................... 359/245 |
| 6,356,673 | B1 | * | 3/2002 | Burns ............................ 385/2 |
| 6,480,633 | B1 | * | 11/2002 | Fleming et al. ................ 385/2 |
| 6,522,792 | B1 | * | 2/2003 | Sugamata et al. ............. 385/2 |

FOREIGN PATENT DOCUMENTS

JP      60008824 A  *  1/1985  ............. G02F/1/03

* cited by examiner

*Primary Examiner*—Juliana K. Kang
(74) *Attorney, Agent, or Firm*—Milbank, Tweed, Hadley & McCloy LLP

(57) ABSTRACT

The present disclosure relates to a device for modulating light emitted by a laser, including an optical substrate that has an electro-optical effect, at least one optical waveguide formed near a front face of the optical substrate, a first electrode that is formed with a conductive transparent film so that a part of the optical waveguide may be covered and is used for applying an electric field to the optical waveguide, a second electrode that is paired with the first electrode and is used for applying an electric field to the optical waveguide, and a third electrode that is formed with a metal film in a position that is shifted from a position just above the optical waveguide and is electrically connected with the first electrode.

11 Claims, 23 Drawing Sheets

-- PRIOR ART --

-- PRIOR ART --

ARRANGEMENT METHOD OF METAL ELECTRODE AND TRANSPARENT ELECTRODE IN OPTICAL WAVEGUIDE DEVICE AND OPTICAL MODULATOR USING THE OPTICAL WAVEGUIDE

FIELD OF THE INVENTION

This invention relates to an optical waveguide device used in fields such as optical communication, optical information processing, and optical signal processing, and more particularly, to an optical waveguide type optical modulator that performs modulation by using the optical waveguide provided in a substrate.

BACKGROUND OF THE INVENTION

The needs of acceleration of optical transmission systems have been increasingly growing with the explosive diffusion of the Internet. An optical signal of a general system is obtained by directly modulating the injection current of a semiconductor laser or a light emitting diode. This is called direct modulation. However, in this direct modulation, a high-speed modulation at several GHz or more is difficult because of influences such as relaxation oscillation. In addition, this direct modulation has a demerit such as difficulty of application to long-distance transmission since wavelength variation occurs.

As means to solve this, there is a method of using an external optical modulator. An external optical modulator performs modulation to fixed light outputted from a semiconductor laser. This is called external modulation. There is an waveguide type optical modulator, constituted by an optical waveguide formed in a substrate, as an optical modulator used for this method. Generally, the waveguide type optical modulator is small and highly efficient, and can operate in high speed.

In particular, if the optical modulator is constituted by using ferroelectric materials such as a lithium niobate ($LiNbO_3$) crystal, it is possible to obtain a low-loss and highly efficient optical modulator. FIG. 1 shows a conventional Mach-Zehnder type optical modulator. In FIG. 1, numeral 1 denotes a lithium niobate ($LiNbO_3$) crystal substrate. An input optical waveguide 2 is slenderly formed by making a refraction index be larger than that of the substrate by diffusing titanium on the $LiNbO_3$ crystal substrate 1. Incidentally, a refraction index of $LiNbO_3$ is about 2.14, but if titanium is diffused, the refraction index increases by about 0.2% to become about 2.144. Thus, a good optical waveguide is formed by using the difference of the refraction indices in a part of $LiNbO_3$ and a part where titanium is diffused. Now, numerals 3 and 4 denote phase shift optical waveguides that each are several mm to 30 mm long and are branched from the input optical waveguide 2. An output optical waveguide 5 is connected to an outgoing side of the phase shift optical waveguides 3 and 4. These constitute a branch interference unit.

Next, an electrode section will be described. FIG. 1 shows a traveling wave type electrode section as an example of the electrode section. First, modulation electrodes 8 are formed in a pair on the optical waveguides 3 and 4 respectively. Here, the outgoing edges of the modulation electrodes 8 are terminated with a resistor R having a value near to line impedance. A modulation electric signal s(t) is inputted into incident edges of the modulation electrodes 8.

In FIG. 1, incident light 9 to the input optical waveguide 2 is divided by branching on its energy, and after passing the phase shift optical waveguides 3 and 4, is made to join in the output optical waveguide 5. At this time, if two beams of light that pass the phase shift optical waveguides 3 and 4 respectively join in the same phase, loss is small, and hence outgoing light 10 has the large quantity of light. However, if the two beams of light that pass the phase shift optical waveguides 3 and 4 respectively become in reverse phases, loss becomes large in a joint section, and hence the quantity of light of the outgoing light 10 is small. Thus, according to the amplitude of a voltage applied to the modulation electrodes 8, a refraction index of the optical waveguide 6 under the electrodes changes with an electro-optical effect. Therefore, since phases of two beams of the light which pass through it change, an optical output corresponding to the applied voltage is obtained, and hence the outgoing light 10 is modulated. In addition, in FIG. 1, the impedance of the modulation electrodes 8 is made to be near to the impedance (usually 50Ω) of an input electrical signal line. Further, the electrodes 8 are terminated with the resistor R whose value is near the impedance, and are made to be a distributed constant circuit, i.e., a traveling waveform electrode. Hence the electrodes can have a wide band.

In an optical modulator like the modulator in FIG. 1, if metal modulation electrodes 8 are directly laid on the phase shift optical waveguides 3 and 4, optical loss becomes large. Then, in order to reduce optical loss, it is effective to provide a buffer layer between the modulation electrodes 8 and the phase shift optical waveguides 3 and 4. As for the buffer layer, $SiO_2$ is used in many cases as a raw material. It is also conceivable to constitute this buffer layer of an indium tin oxide (ITO). ITO is used in many cases as a transparent electrode, and is formed on an optical waveguide by evaporation coating. Conventionally, in this way, this electrode has three-layer structure that evaporation coating of the transparent electrode is performed on an optical waveguide and a metal electrode is further formed.

However, when the electrode section has such three-layer structure, light leaks out from the transparent electrode to the metal electrode, and in particular, under high-speed modulation, optical loss caused by leaking out cannot be disregarded.

Hence, although it is desirable to constitute an electrode only with a transparent electrode, it becomes impossible to perform wire bonding etc. without a metal electrode, and hence an optical modulator cannot be substantially constituted.

SUMMARY OF THE INVENTION

Accordingly, it is an object of the present invention to provide an optical modulator and an optical waveguide device that can modulate higher than conventional ways.

According to the present invention, the foregoing object is attained by providing a device for modulating light emitted by a laser, comprising:

an optical substrate that has an electro-optical effect;
at least one optical waveguide formed near a front face of the above-described optical substrate;
a first electrode that is formed with a conductive transparent film so that a part of the above-described optical waveguide may be covered and is used for applying an electric field to the above-described optical waveguide;
a second electrode that is paired with the above-described first electrode and is used for applying an electric field to the above-described optical waveguide; and
a third electrode that is formed with a metal film in a position which is shifted from a position just above the above-described optical waveguide and is electrically connected with the above-described first electrode.

According to the present invention, the foregoing object is attained by providing a device for modulating light emitted by a laser, comprising:

an optical substrate that has an electro-optical effect;

a first optical waveguide formed near a front face of the above-described optical substrate;

a first electrode that is formed with a conductive transparent film so that a part of the above-described optical waveguide may be covered and is used for applying an electric field to the above-described optical waveguide;

a second optical waveguide formed near a front face of the above-described optical substrate;

a second electrode that is formed with a conductive transparent film so that a part of the above-described optical waveguide may be covered and is used for applying an electric field to the above-described optical waveguide;

a third electrode that is paired with the above-described first electrode and the above-described second electrode and is used for applying an electric field which has correlation to the above-described first optical waveguide and the above-described second optical waveguide respectively;

a fourth electrode that is formed with a metal film in a position which is shifted from a position just above the above-described optical waveguide and is electrically connected with the above-described first electrode; and a fifth electrode that is formed with a metal film in a position which is shifted from a position just above the above-described optical waveguide and is electrically connected with the above-described second electrode.

In accordance with the present invention as described above, it becomes possible to prevent optical loss and to achieve further high-speed modulation by forming a metal electrode in another part except a part formed on the optical waveguide in a transparent electrode. Of course, a part of the metal electrode may be arranged with being superimposed on the part formed on the optical waveguide in the transparent electrode. It will be desirable to limit a degree of superposition to a minimum necessary degree without performing full superimposition as in a conventional way.

The invention is particularly advantageous since it becomes possible to prevent optical loss and to achieve further high-speed modulation by forming a metal electrode so that the metal electrode may not be superimposed as much as possible on a part formed on an optical waveguide in a transparent electrode. Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
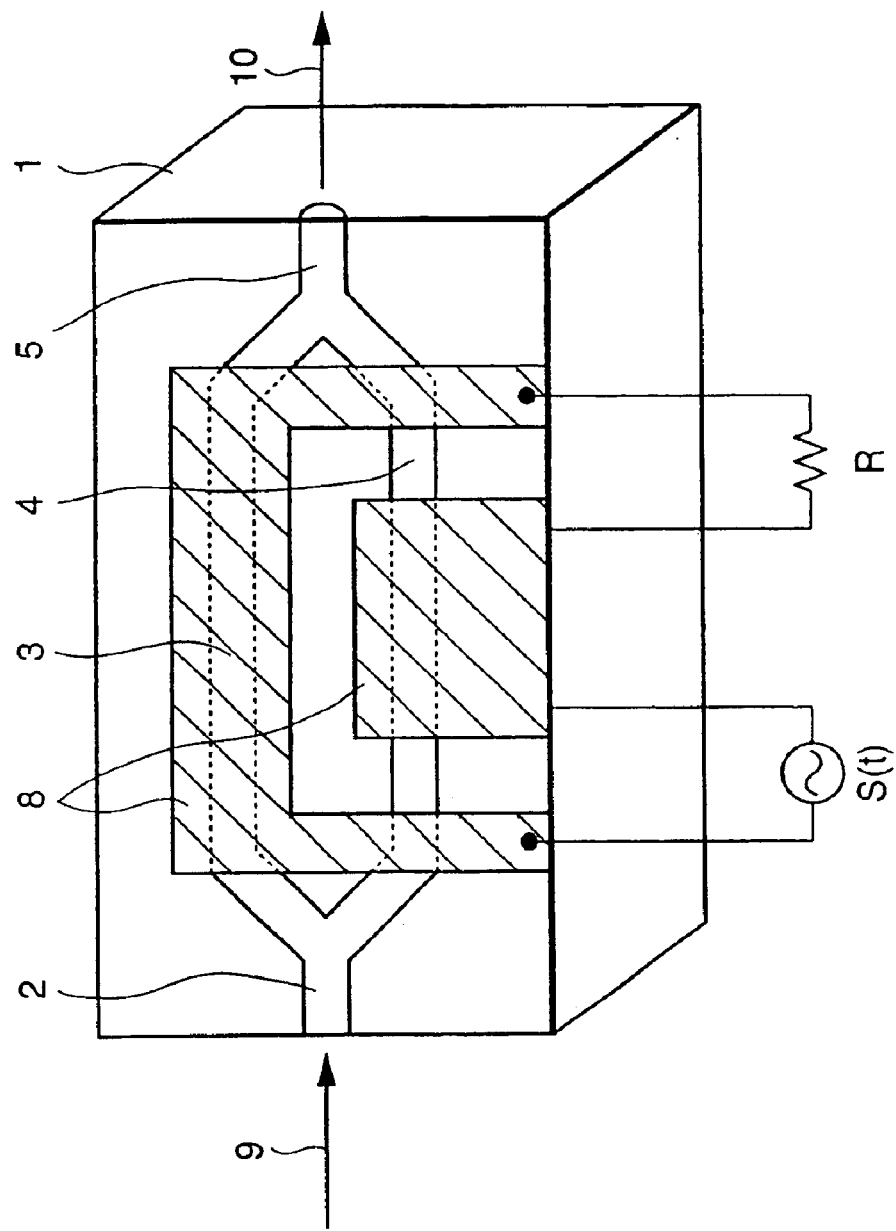
FIG. 1 is a perspective view of prior art.
Figure 2:
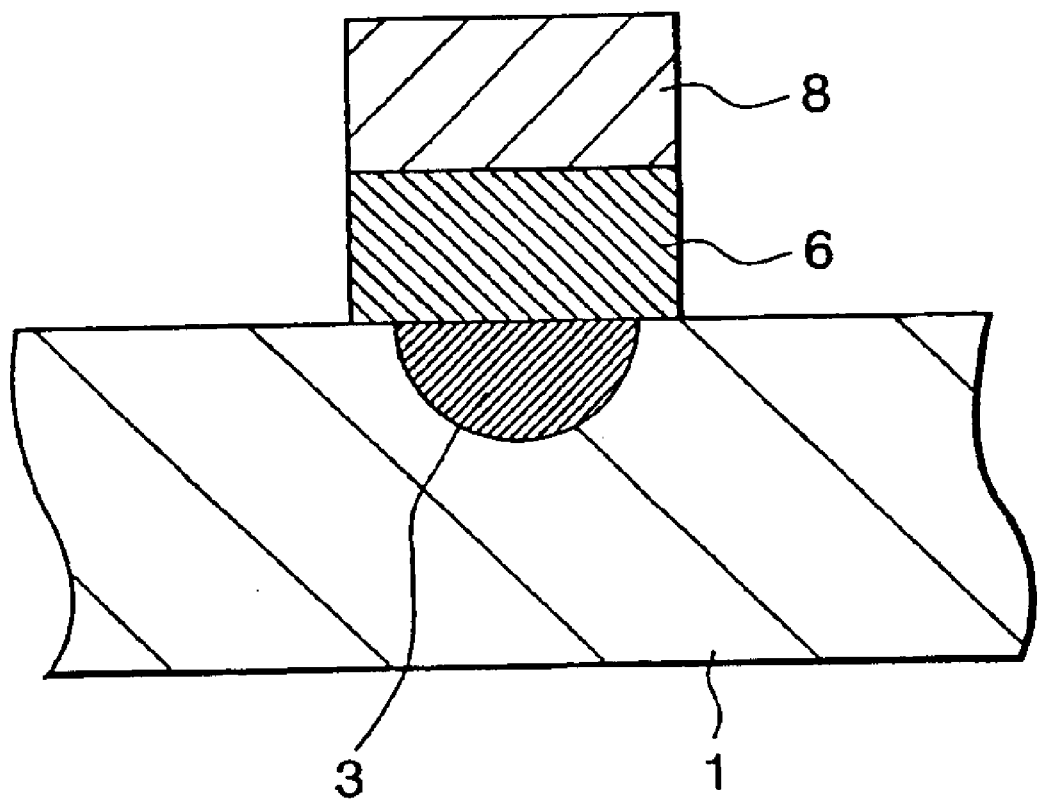
FIG. 2 is a longitudinal sectional view of an optical waveguide part of the prior art.

FIG. 2 shows technique relevant to this embodiment. FIG. 2 is a longitudinal sectional view of an optical waveguide device in related technique. An optical substrate 1 consists of LiNbO$_3$, and has an electro-optical effect. An optical waveguide 3 is formed near a front face of the optical substrate 1. A buffer layer 6 that consists of a conductive transparent film is formed so that a part of the optical waveguide may be covered, and can apply an electric field to the optical waveguide. In addition, an electric field can be applied to an optical waveguide by generating potential difference from the external between a first electrode including the conductive transparent film 6 and a second electrode which is paired with the conductive transparent film (not shown). A metal film 8 is electrically connected with the above-described conductive transparent film 6 formed thereunder. Thus, the metal film plays a role of an electrode terminal of the conductive transparent film 6. Here, in particular a point that should be noted is that the optical waveguide 3, conductive transparent film 6, and metal electrode 8 are stacked so as to fully superimpose one another. Here, superposition means to overlap each other in the direction orthogonal to a front face of the optical substrate 1.

However, if they are completely superimposed in this way, the metal film absorbs light that passes the optical waveguide 3. In consequence, the high-speed modulation of the optical modulator is disturbed.

Figure 3A:
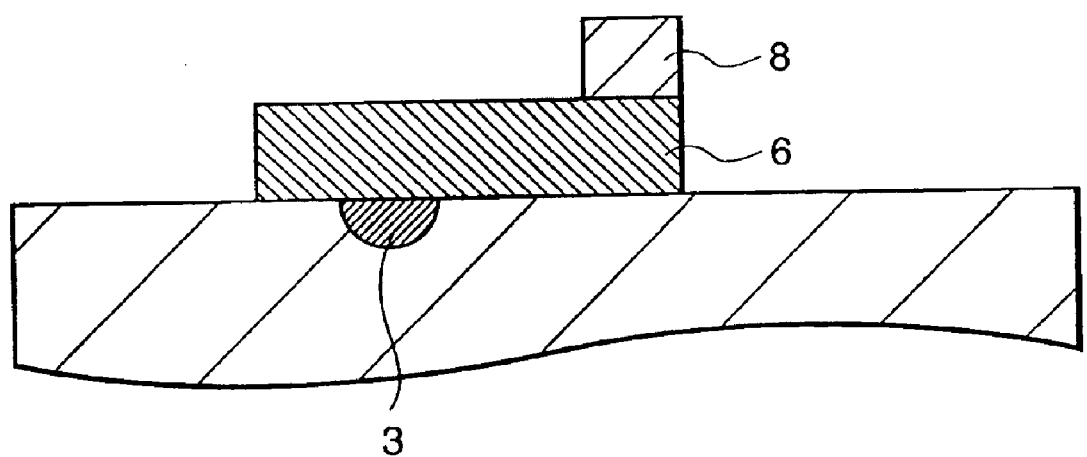
FIG. 3A is a longitudinal sectional view of the optical waveguide device in an embodiment.
Figure 3B:
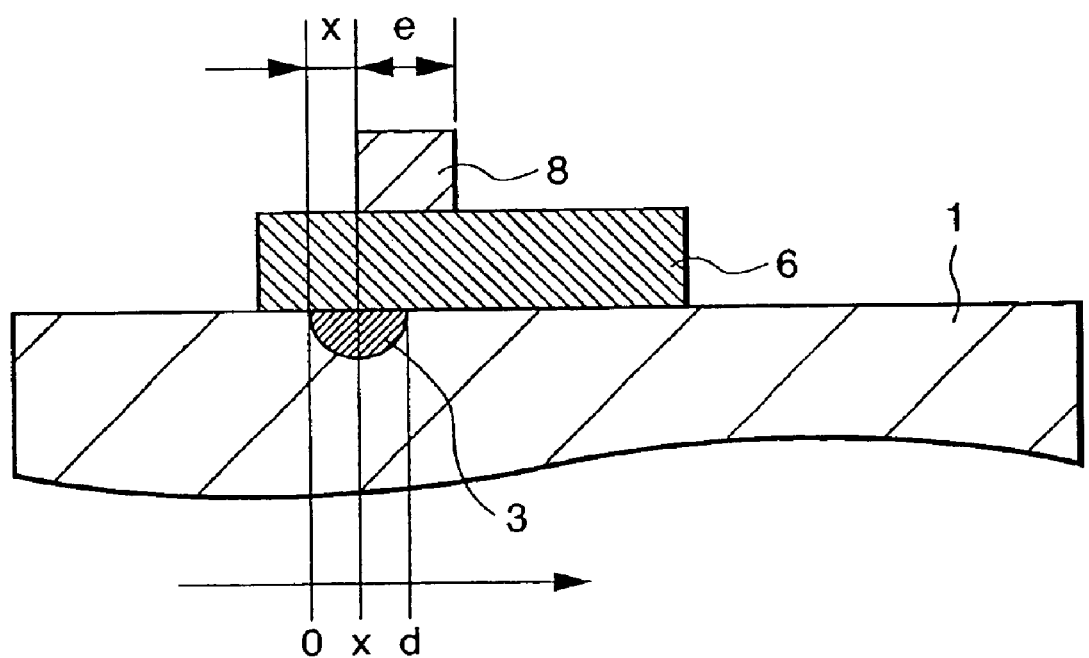
FIG. 3B illustrates the embodiment of the structure that a part of a metal film superimposes on an optical waveguide.

Then, as shown in FIG. 3A, this embodiment is intended to reduce optical loss by forming the metal film 8 in a position that is not just above the optical waveguide 3. In addition, in the example shown in FIG. 3A, the metal film 8 does not overlap the optical waveguide 3. However, as shown in FIG. 3B, the metal film 8 can be arranged so that a part of the metal films 8 may lap on the optical waveguide 3. Thus, this means that a surface area of the metal film 8 on the optical waveguide 3 becomes smaller than a surface area of the conductive transparent film 6 on the optical waveguide 3. In other words, it can be expressed that the metal film 8 is formed shifting toward a side apart from the optical waveguide 3 on the conductive transparent film 6. Thus, although a part of the metal films 8 may be overlapped on the optical waveguide 3, light absorption loss also becomes smaller as the degree of overlapping is small, and hence it is desirable to make the films not lap as much as possible.

FIG. 3B shows the relation between the optical waveguide 3, conductive transparent film 6, and metal electrode 8 by using coordinates. In the figure, line coordinates will be considered by letting an edge in the left-hand side of the optical waveguide be an origin, the line coordinates which are parallel to a front face of the optical substrate 1 and extend in the vertical direction of the optical substrate 1. In case of letting the width of the optical waveguide 3 be d, letting the width of the metal film 8 be e, and letting a starting position of the metal film be X, it means no overlapping if X>d. Furthermore, if 0<X<d, it means that a part of the metal films 8 overlaps with the optical waveguide 3.

Figure 4:
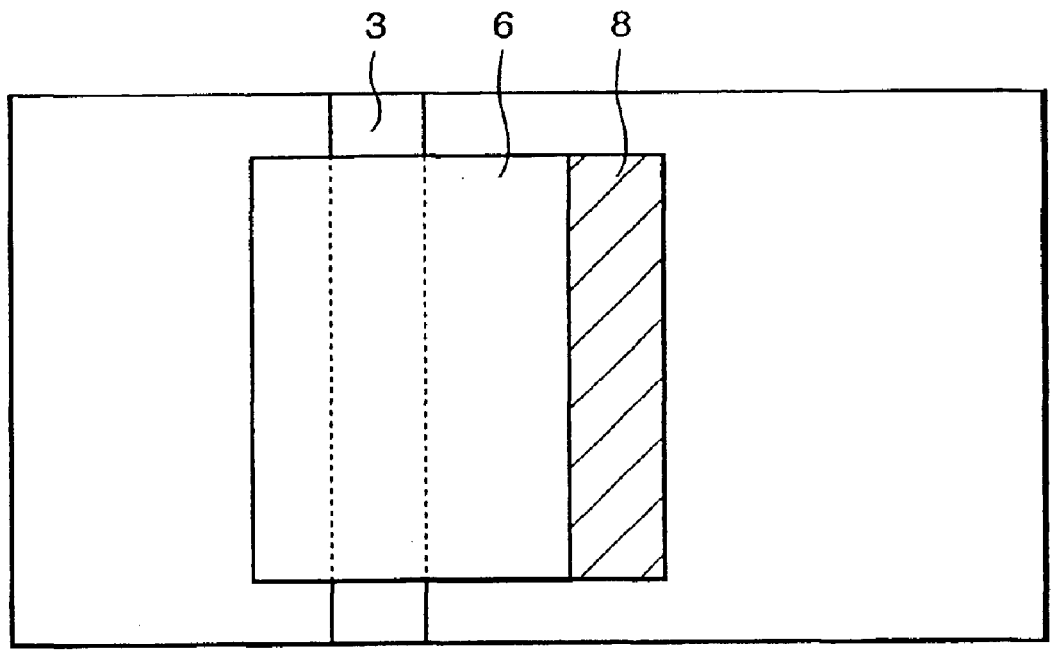
FIG. 4 is a plan of the optical waveguide device in the embodiment.

FIG. 4 is a plan of the optical waveguide device shown in FIG. 3A when seen from the top. As seen from this figure, the metal film 8 does not exist just above the optical waveguide 3, but the metal film 8 exists in a position which is a few apart from the position just above the optical waveguide 3. In addition, the widths of the metal film 8 and conductive transparent film 6 are the same in the embodiment shown in FIG. 4. However, this is just an example, and hence the width of the metal film 8 may be narrower than that of the conductive transparent film 6.

Figure 5:
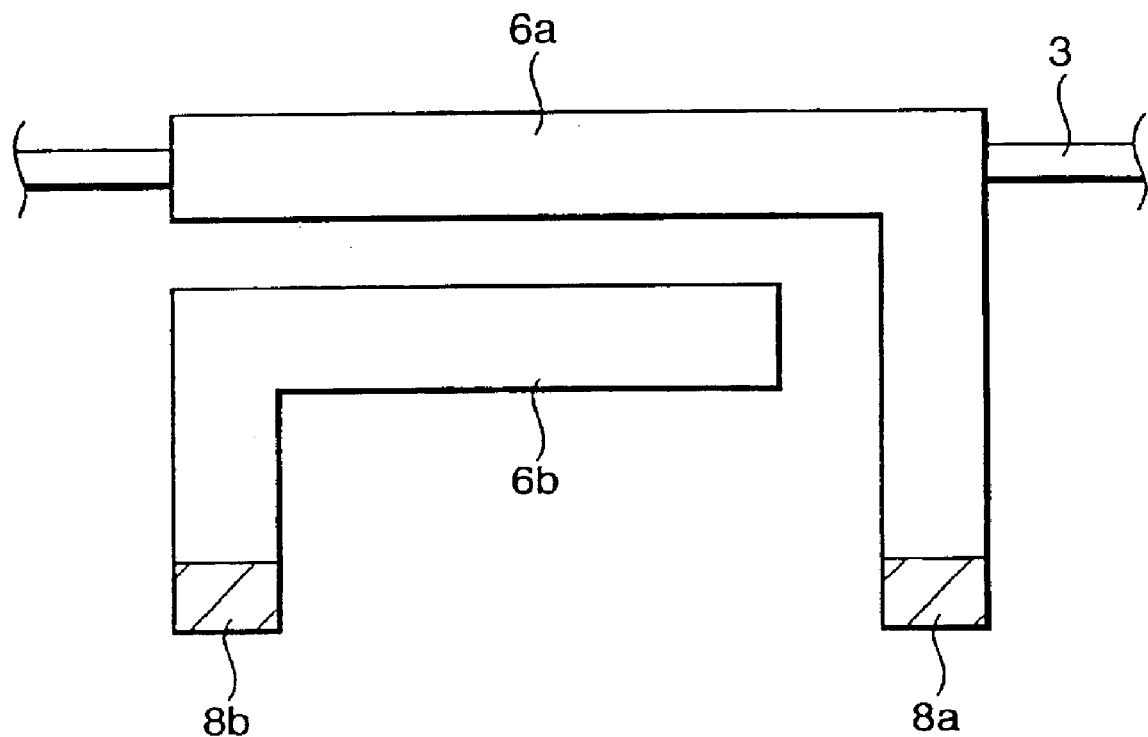
FIG. 5 is a plan showing an embodiment where metal films are provided in edges of L-shaped conductive transparent films.

FIG. 5 shows another embodiment. In FIG. 5, a conductive transparent film 6a is formed on the optical waveguide 3. A metal film 8a is formed on the conductive transparent film 6a in a position apart from the optical waveguide 3. A conductive transparent film 6b is formed toward the outside from the vicinity of the above-described optical waveguide 3. In addition, the metal film 8b is on the conductive transparent film 6b, and is formed in a position apart from the optical waveguide 3. Namely, the first electrode that consists of the conductive transparent film 6a and metal film 8a is paired with the second electrode that consists of the conductive transparent film 6b and metal film 8b. When an electrical signal is added to these ends, a refraction index of an optical waveguide changes to correlate with this electrical signal.

Figure 6:
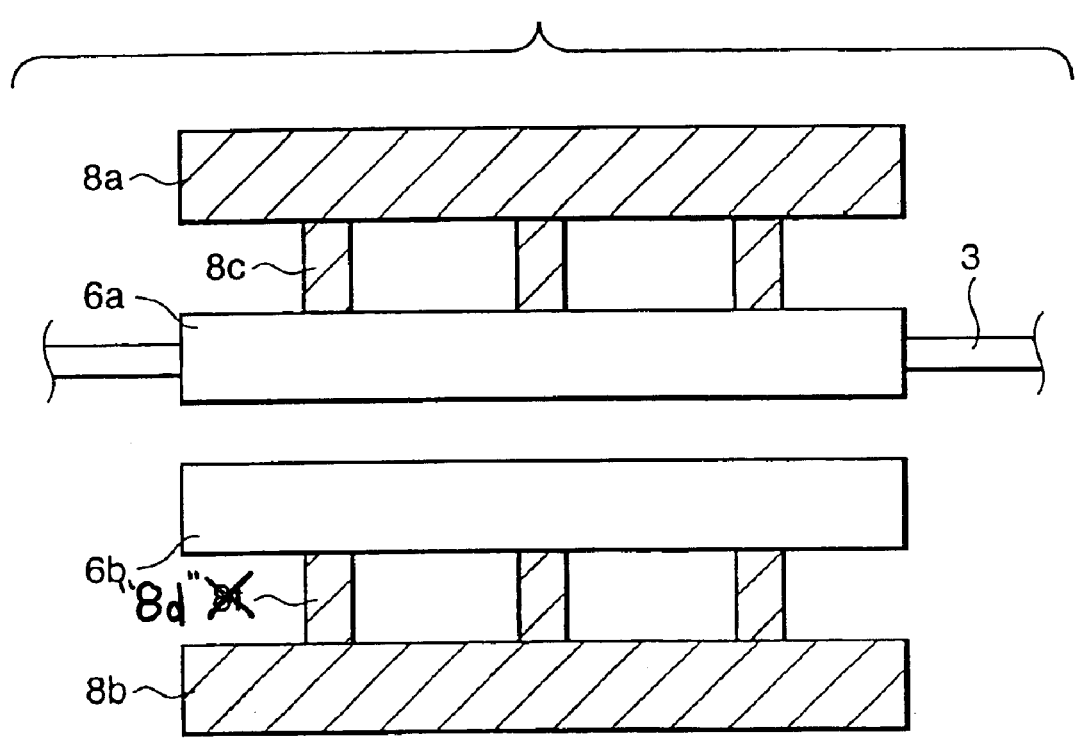
FIG. 6 is a plan showing an embodiment where conductive transparent films and metal films are connected with thin lines.

FIG. 6 shows still another embodiment. A conductive transparent film 6a is formed on the optical waveguide 3. A metal film 8a is formed in the position apart from the conductive transparent film 6a along the conductive transparent film 6a. This conductive transparent film 6a and metal film 8a are electrically connected with thin lines 8c which each consist of a metal film or a conductive transparent film. A conductive transparent film 6b is formed along the optical waveguide 3 in the vicinity of the above-described optical waveguide 3. In addition, a metal film 8b is formed in a position apart from the conductive transparent film 6b along the conductive transparent film 6b. The thin lines 8d which each consist of a metal film or a conductive film electrically connects the metal film 8b. In addition, under each metal film, a conductive transparent film can be also formed. In addition, the thin lines 8c and 8d each can also consist of other material that is not a metal film or a conductive transparent film so long as the material is a conductive one.

Figure 7A:
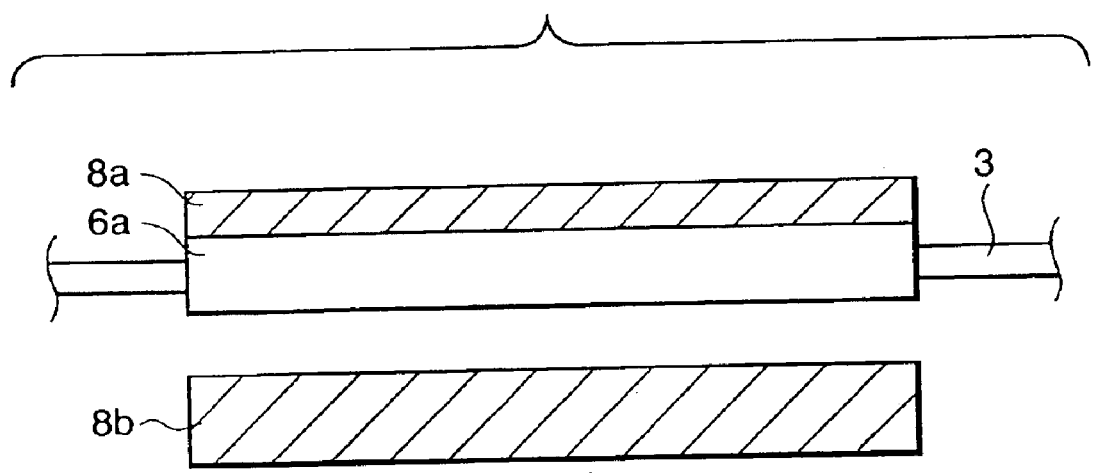
FIG. 7A is a plan showing an embodiment where a conductive transparent film and metal films are formed along an optical waveguide.

FIG. 7A is a modified example of the optical waveguide device shown in FIG. 6. On the optical waveguide 3, the conductive transparent film 6a is formed, and the metal film 8a is formed outside the conductive transparent film 6a with being electrically connected. In addition, under the metal film 8a, the conductive transparent film 6a may exist. In such a case, the width of the conductive transparent film 6a becomes larger that the width of the optical waveguide 3. The metal film 8b is formed in a position a few apart from the optical waveguide 3 along the optical waveguide 3, and constitutes the second electrode which is paired with the first electrode which consists of the conductive transparent film 6a and metal film 8a. In addition, a conductive transparent film may be also formed under the metal film 8b.

Figure 7B:
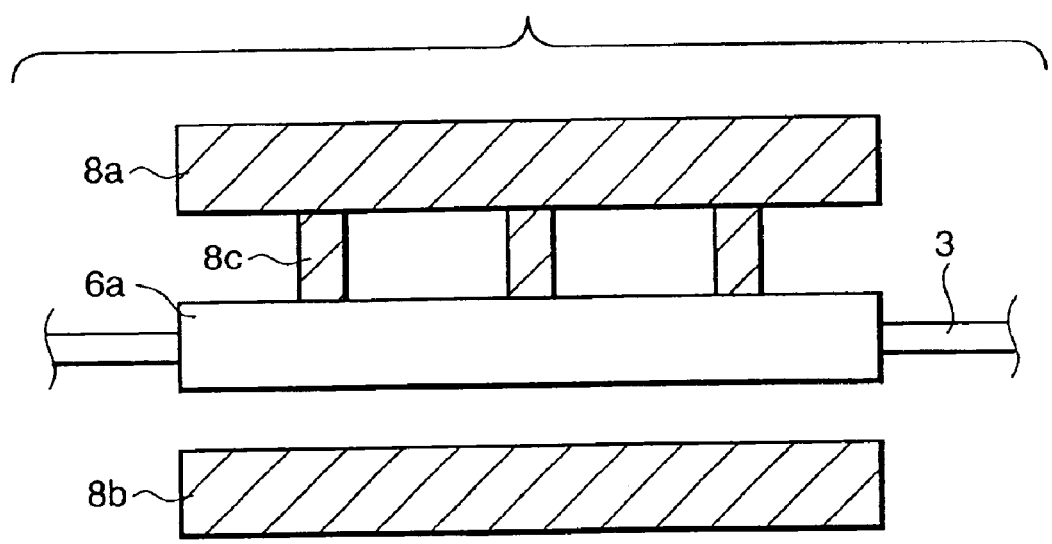
FIG. 7B is a plan showing an embodiment where a conductive transparent film and a metal film are connected with thin lines to form one electrode.

FIG. 7B is another modified example of the optical waveguide device shown in FIG. 6. In this embodiment, the first electrode in the side of the optical waveguide 3 is made to be in the same structure as that of the electrode shown in FIG. 6. Furthermore, the second electrode that is paired with the first electrode is made to be in the same structure as that of the electrode shown in FIG. 7A.

Figure 8:
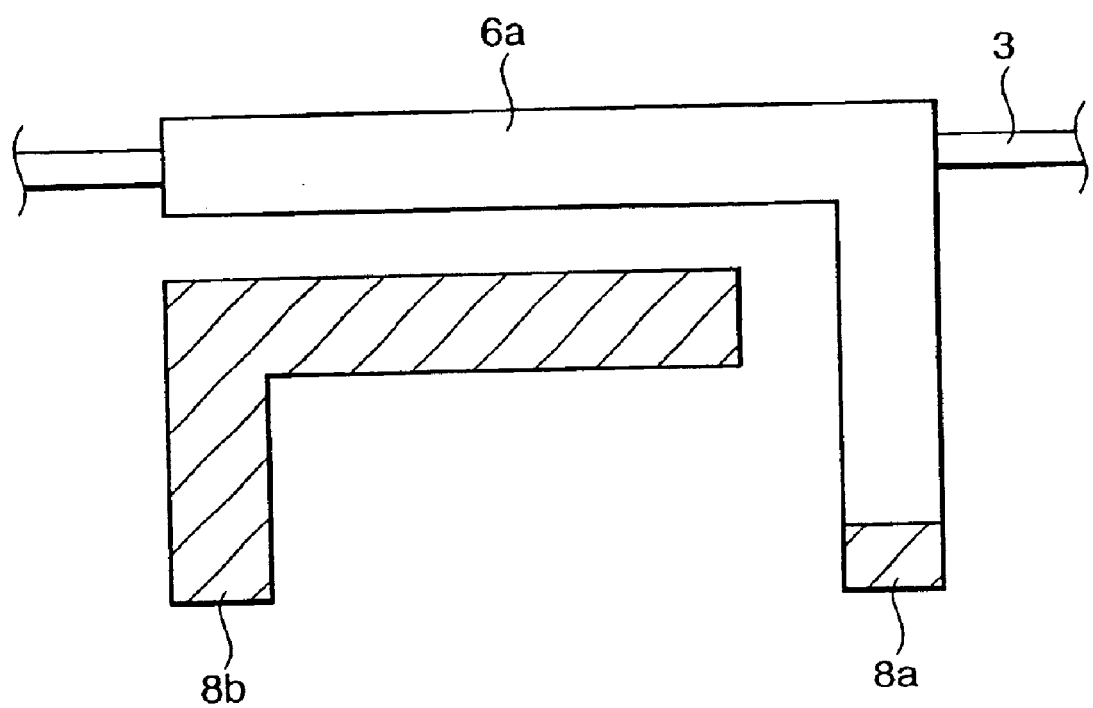
FIG. 8 is a plan showing an embodiment where another electrode is formed only with a metal film.

FIG. 8 is a modified example of the optical waveguide device shown in FIG. 5. In particular, in the embodiment shown in FIG. 8, the metal film 8b is formed so as to cover the entire conductive transparent film 6b. In addition, the metal film 8b may be formed not on the conductive transparent film 6b but on the optical substrate 1 directly.

Figure 9:
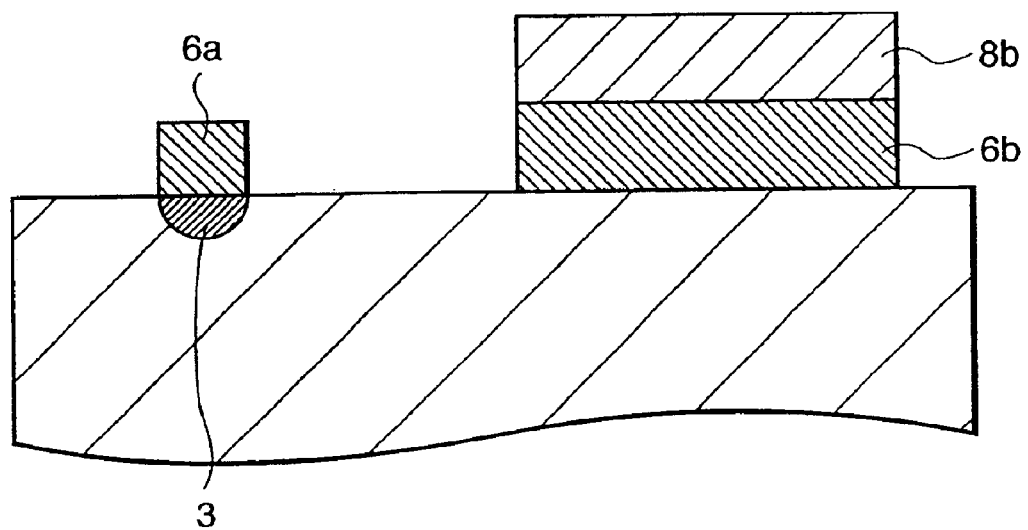
FIG. 9 is a sectional view showing an embodiment where an electrode, which is not above an optical waveguide, is formed with a conductive transparent film and a metal film.

FIG. 9 shows a sectional view of an optical waveguide device according to this embodiment. On the optical waveguide 3, the conductive transparent film 6a that constitutes a part of first electrode is formed. The conductive transparent film 6b and metal film 8b that constitute the second electrode are formed in a position apart from this conductive transparent film 6a.

Figure 10A:
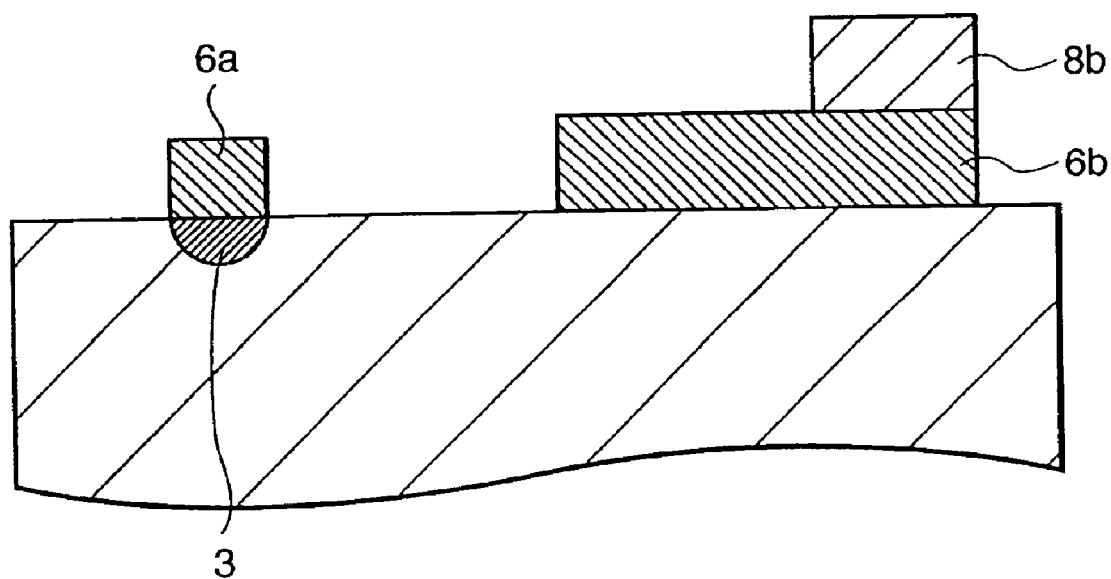
FIG. 10A is a sectional view showing an embodiment where a metal film is formed in size smaller than that of a conductive transparent film in the structure shown in FIG. 9.
Figure 10B:
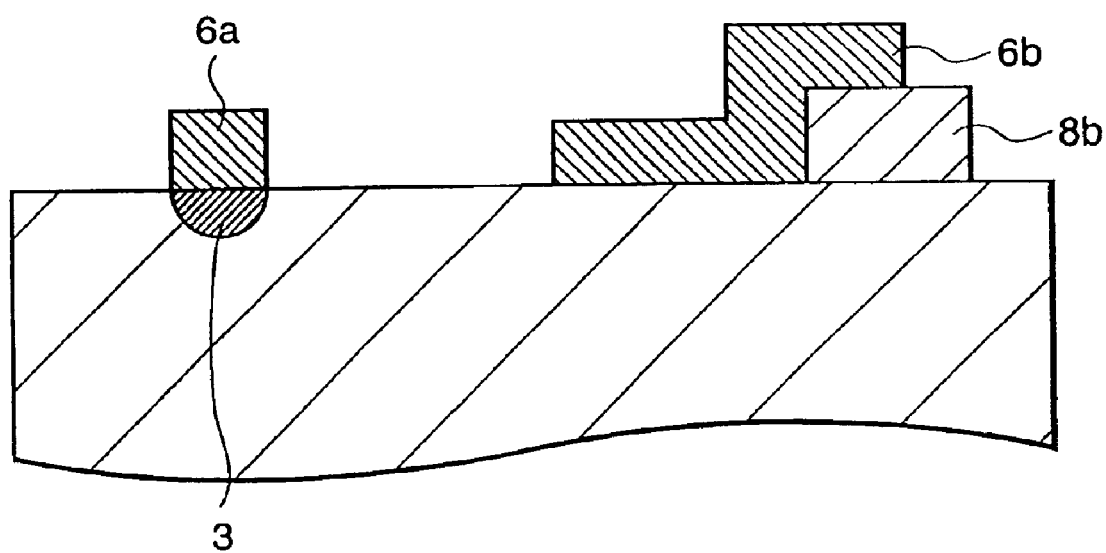
FIG. 10B is a sectional view showing an embodiment where a metal film is formed under a conductive transparent film in an electrode that is not above an optical waveguide.

FIGS. 10A and 10B are the modified examples of the embodiment shown in FIG. 9. In FIG. 10A, a surface area of the metal film 8*b* is smaller than a surface area of the conductive transparent film 6*b*. Moreover, the metal film 8*b* is on the conductive transparent film 6*b*, and shifts toward the side apart from the optical waveguide 3. In FIG. 10B, the metal film 8*b* is formed outside the conductive transparent film 6*b*. From another viewpoint, it can be also said that a part of the conductive transparent film 6*b* overhangs the metal film 8*b*. Only a part is overhanged because wire bonding cannot be given to the metal film 8*b* if the conductive transparent film 6*b* completely covers the metal film 8*b*.

Figure 11:
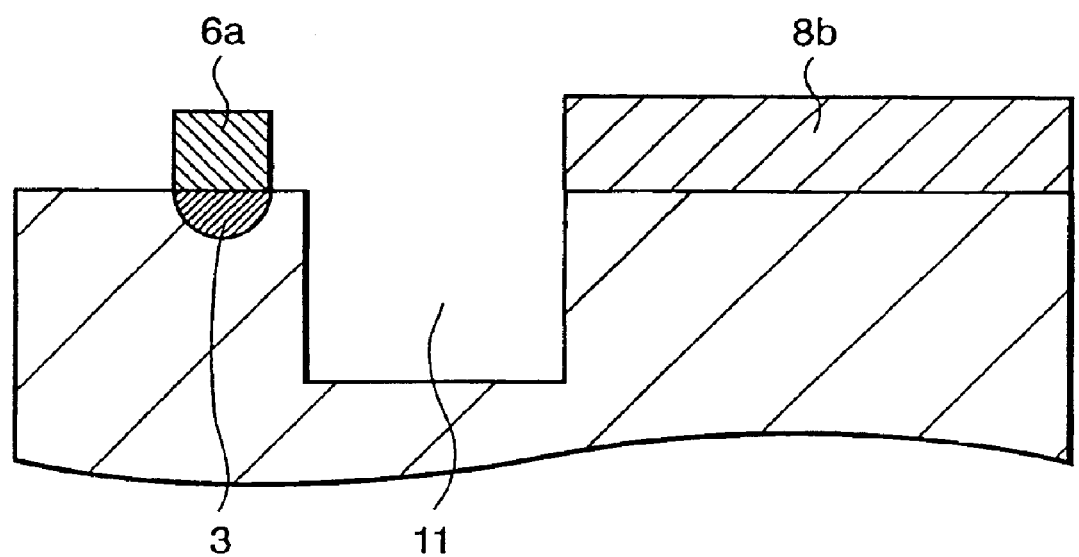
FIG. 11 is a sectional view showing an embodiment where a groove is formed between two electrodes.

FIG. 11 shows an embodiment where a groove is provided in a part of the optical substrate 1 between the conductive transparent film 6*a* and metal film 8*b* that are formed on the optical waveguide 3. This groove can be formed by etching etc.

Figure 12:
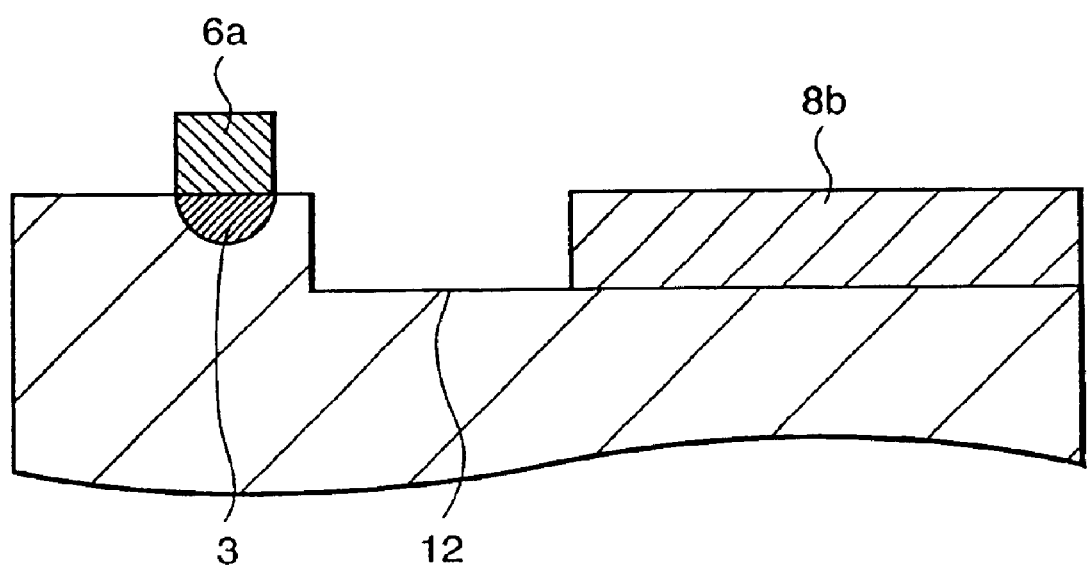
FIG. 12 is a sectional view showing an embodiment where a step is provided between two electrodes.

FIG. 12 shows etching also including a bottom of the metal film 8*b* in the embodiment shown in FIG. 11. In other words, the metal film 8*b* is formed on an area lower than a surface area of the optical substrate 1 in which the optical waveguide 3 is formed.

Figure 13A:
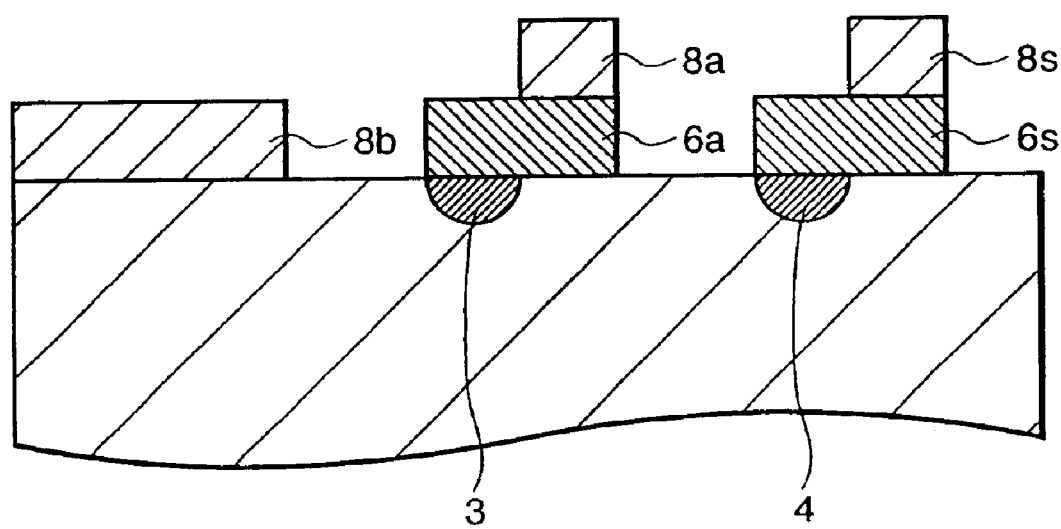
FIG. 13A is a sectional view showing an embodiment about an optical waveguide device equipped with a plurality of optical waveguides.

FIG. 13A shows an embodiment of an optical waveguide device equipped with a plurality of optical waveguides. In FIG. 13A, a conductive transparent film 6*a* formed on the first optical waveguide 3, and a metal film 8*a* that is on the conductive transparent film 6*a* and is formed in a position apart from the first optical waveguide 3 exists in the side of the first optical waveguide 3. On the other hand, the conductive transparent films 6*s* formed on the second optical waveguide 4, and the metal films 8*s* that is on the conductive transparent films 6*s* and is formed in a position apart from the second optical waveguide 4 exists in the side of the second optical waveguide 4. In addition, as an electrode for electric field addition, the metal film 8*b* is formed. Namely, the optical waveguide device according to this embodiment comprises: an optical substrate 1 which has an electro-optical effect; a first optical waveguide 3 formed near a front face of the above-described optical substrate 1; a conductive transparent film 6*a* formed so that a part of the above-described first optical waveguide 3 may be covered in order to apply an electric field to the above-described first optical waveguide 3; a second optical waveguide 4 formed near a front face of the above-described optical substrate 1; a conductive transparent film 6*s* formed so that a part of the above-described second optical waveguide 4 may be covered in order to apply an electric field to the above-described second optical waveguide; a metal film 8*b* which is paired with the conductive transparent films 6*a* and 6*s* and is an electrode for applying an electric field, which has correlation, to the above-described first optical waveguide 3 and the above-described second optical waveguide 4, respectively; a metal film 8*a* which is formed with being electrically connected with the above-described conductive transparent film 6*a* in a position which is not just above the above-described first optical waveguide 3; and a metal film 8*s* which is formed with being electrically connected with the above-described conductive transparent film 6*s* in a position which is not just above the above-described second optical waveguide 4. A Mach-Zehnder type optical modulator can be constituted by applying such an optical waveguide device.

Figure 13B:
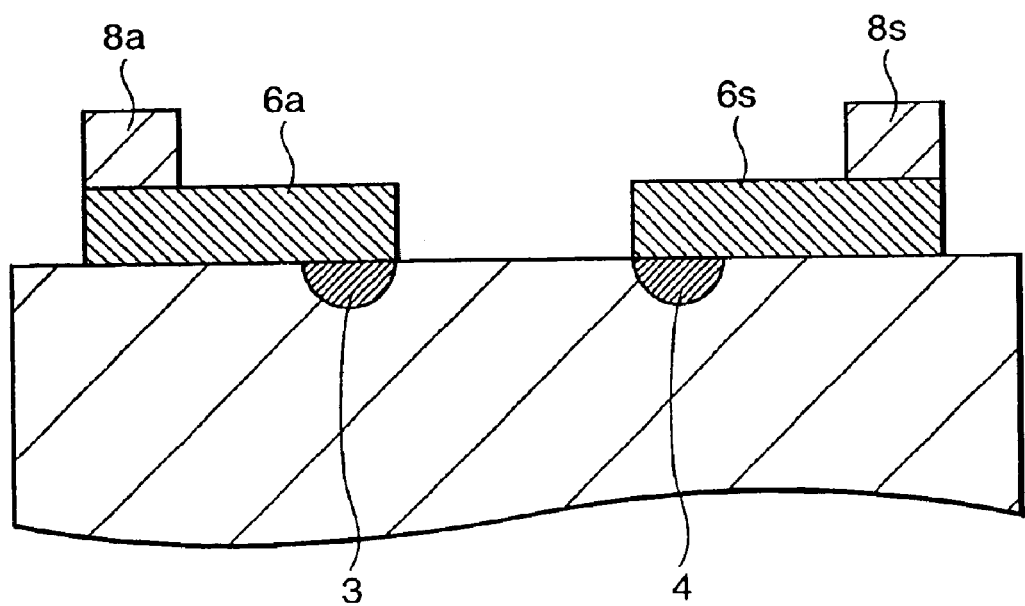
FIG. 13B is a sectional view showing an embodiment where electrodes corresponding to respective optical waveguides are provided outside a plurality of optical waveguides.

FIG. 13B is a modified example of the embodiment shown in FIG. 13A. Concretely, the conductive transparent film 6*a* is formed so that the conductive transparent film 6*a* in the side of the first optical waveguide 3 may overhang in the opposite side of the second optical waveguide 4, and the metal film 8*a* is formed thereon. In other words, at least one of the metal films 8*a* and 8*s* is arranged outside an area surrounded by the first optical waveguide 3 and second optical waveguide 4. It becomes possible to exhibit an effect of reducing a coupling phenomenon between the conductive transparent films 6*a* and 6*b*, by adopting such structure.

Figure 14:
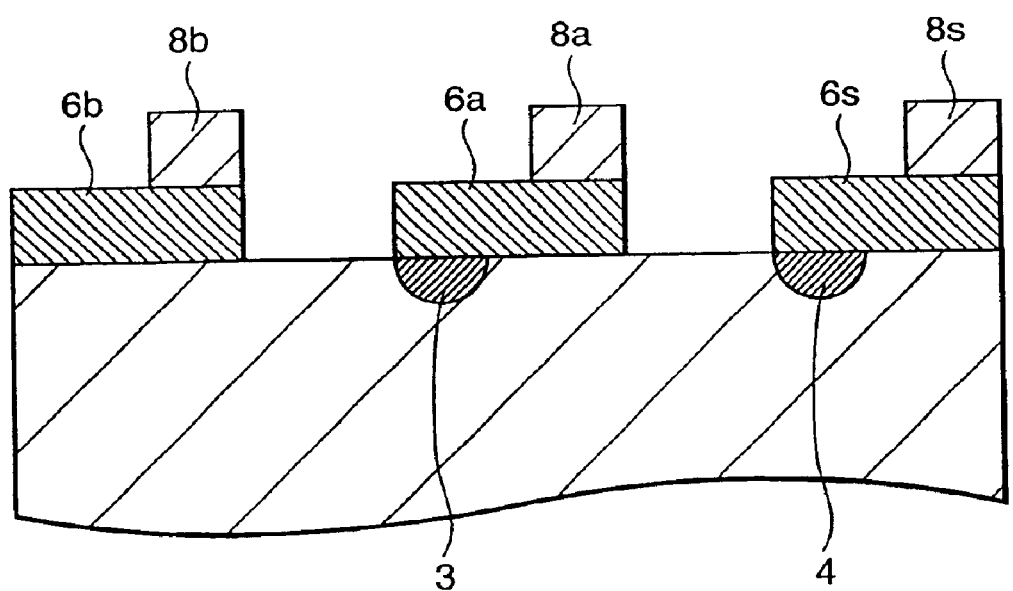
FIG. 14 is a sectional view showing an embodiment where an electrode that is not above an optical waveguide is formed by stacking a conductive transparent film and a metal film.

FIG. 14 is another modified example. Further concretely, the conductive transparent film 6*b* is formed on the optical substrate 1, and the metal film 8*b* is further formed thereon. In addition, also in this case, the metal film 8*b* is on the conductive transparent film 6*b*, and shifts on the above-described conductive transparent film 6*b* in the side near the optical waveguide 3 that is nearer between the above-described first and second optical waveguides.

Figure 15:
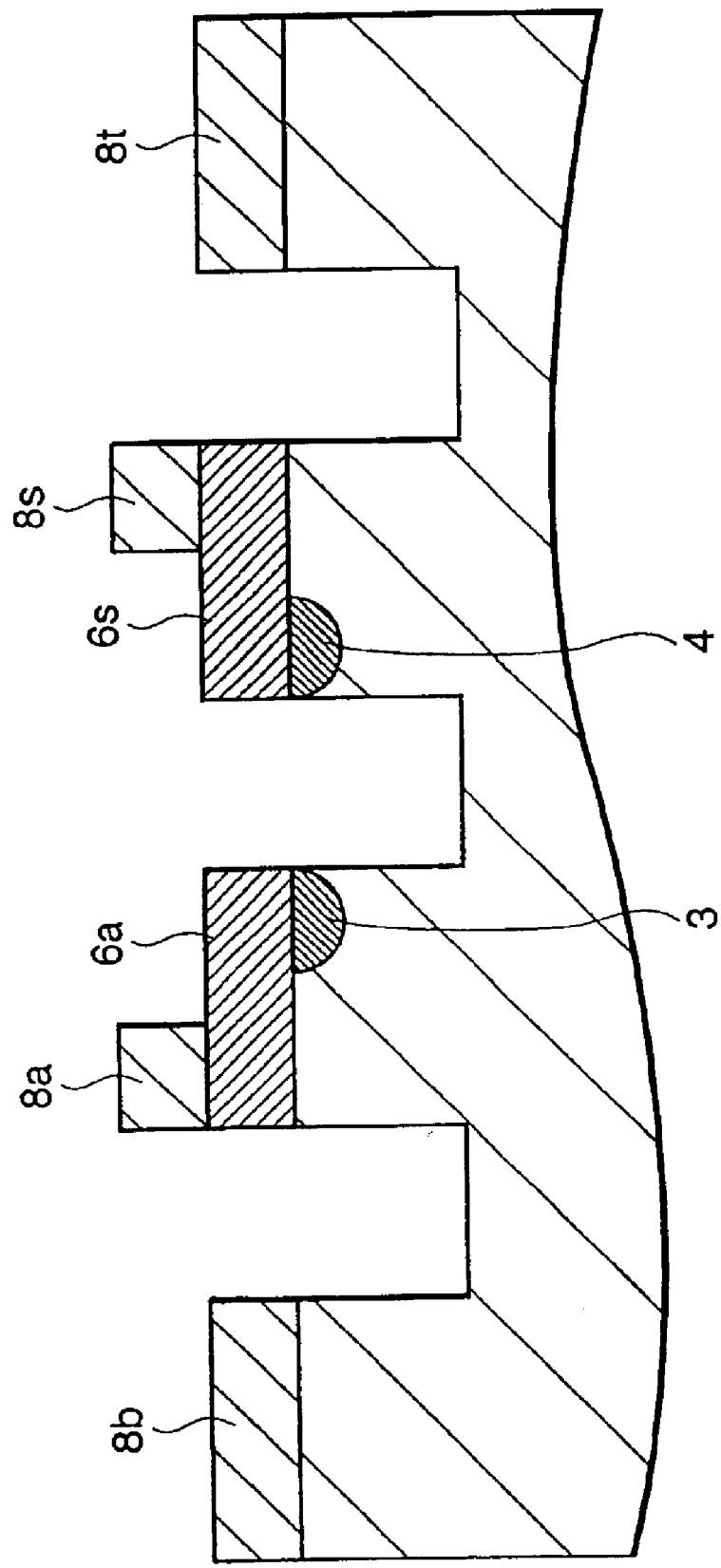
FIG. 15 is a sectional view showing an embodiment where grooves are formed between pluralities of electrodes.

FIG. 15 shows an embodiment of an optical waveguide device having a groove 11 between respective electrodes by etching. Furthermore, in this embodiment, a metal film 8*t* is provided as an electrode that is paired with the metal film 8*s* and conductive transparent film 6*s*. Now, in FIG. 15, the grooves 11 are provided between the metal film 8*b* and conductive transparent film 6*a*, between the conductive transparent film 6*a* and conductive transparent film 6*s*, and between the conductive transparent film 6*s* and metal film 8*t* respectively. In the embodiment shown in FIG. 15, although three grooves are formed in total, any one of the three grooves may be also provided. In addition, any two grooves consisting of arbitrary combination among three grooves may be provided.

Figure 16:
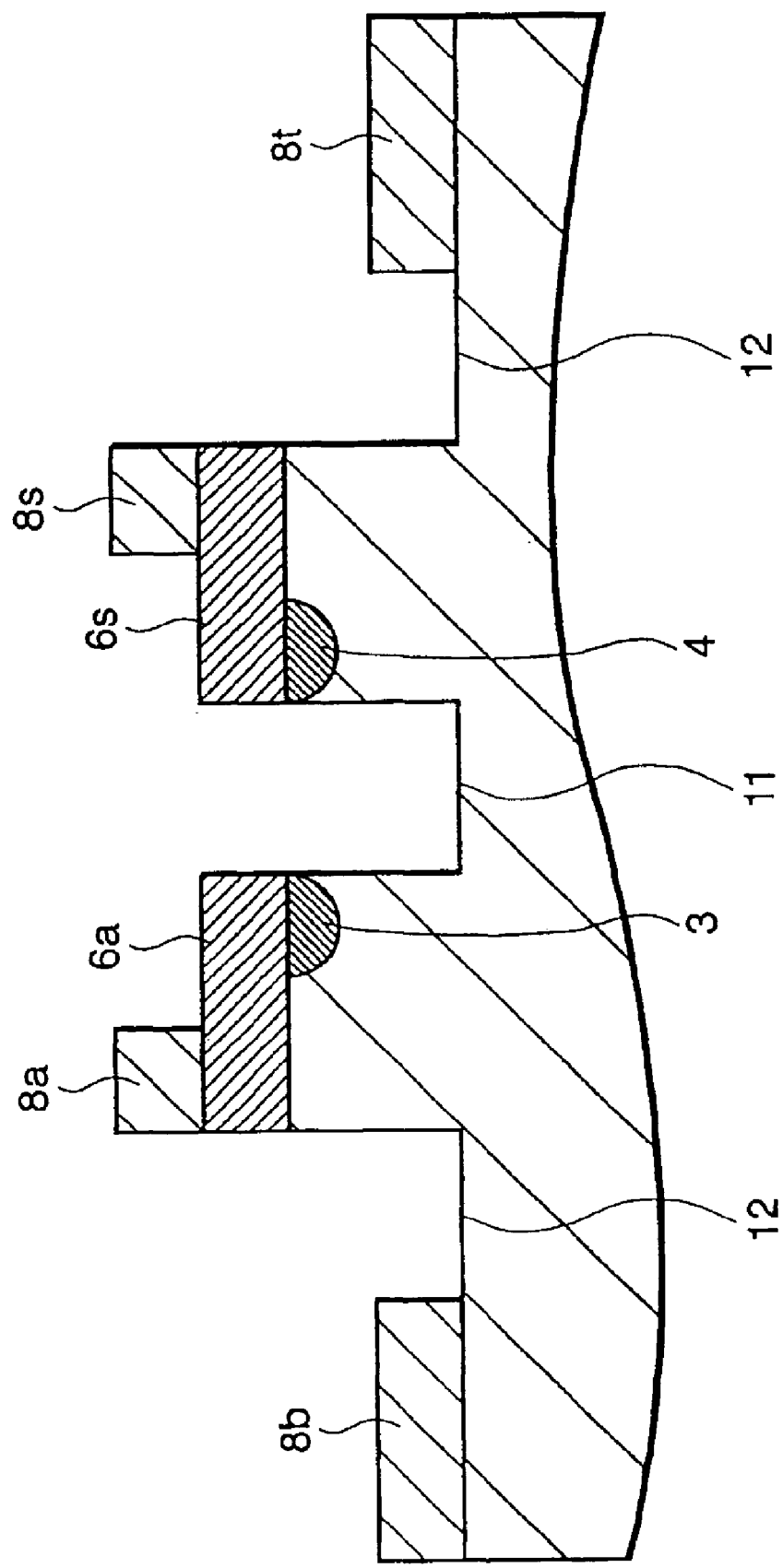
FIG. 16 is a sectional view showing an embodiment where steps are provided between pluralities of electrodes.

FIG. 16 shows an embodiment where an etching area is further expanded even to the bottom of the metal films 8*b* and 8*t* in the embodiment shown in FIG. 15. In other word, at least one of the metal films 8*b* and 8*t* is formed on an area 12 lower than a surface area of the optical substrate on which the optical waveguide is formed.

Figure 17:
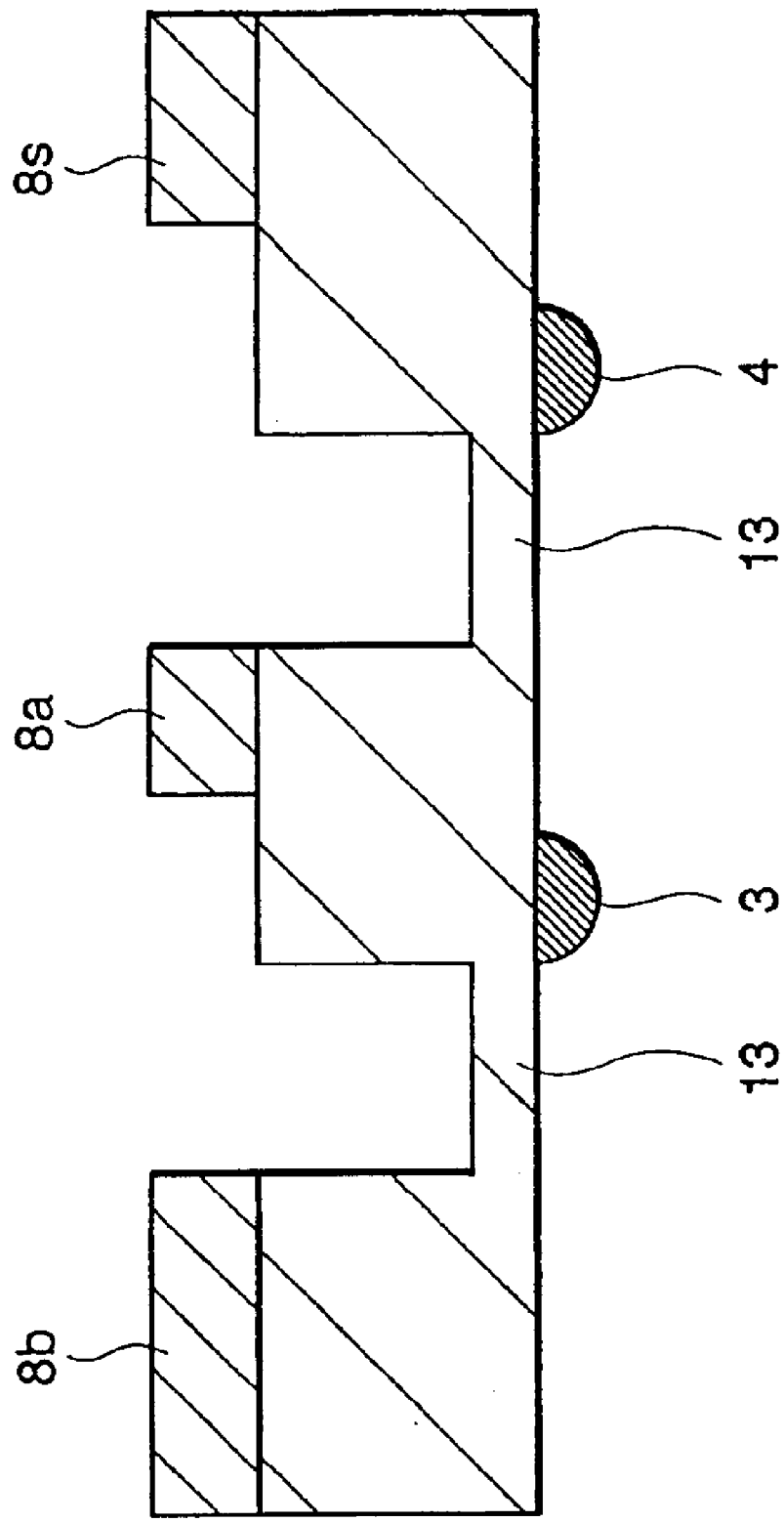
FIG. 17 is a sectional view showing an embodiment where pluralities of conductive transparent films are connected with thinner conductive transparent films.

FIG. 17 shows an embodiment where the depth of the grooves 11 is changed in the embodiment shown in FIG. 15. More specifically, the conductive transparent film 13 is thinly left without digging the grooves 11 to the optical substrate 1. In other words, a conductive transparent film (thin film 13) thinner than the following conductive transparent films exists between the conductive transparent film that exists under the metal film 8*a*, and the conductive transparent film that exists under the metal film 8*s*. In addition, the thin film 13 can be provided between the conductive transparent film that exists under the metal film 8*a*, and the conductive transparent film that exists under the metal film 8*b*, or between the conductive transparent film that exists under the metal film 8*s*, and the conductive transparent film that exists under the metal film 8*t*.

Figure 18:
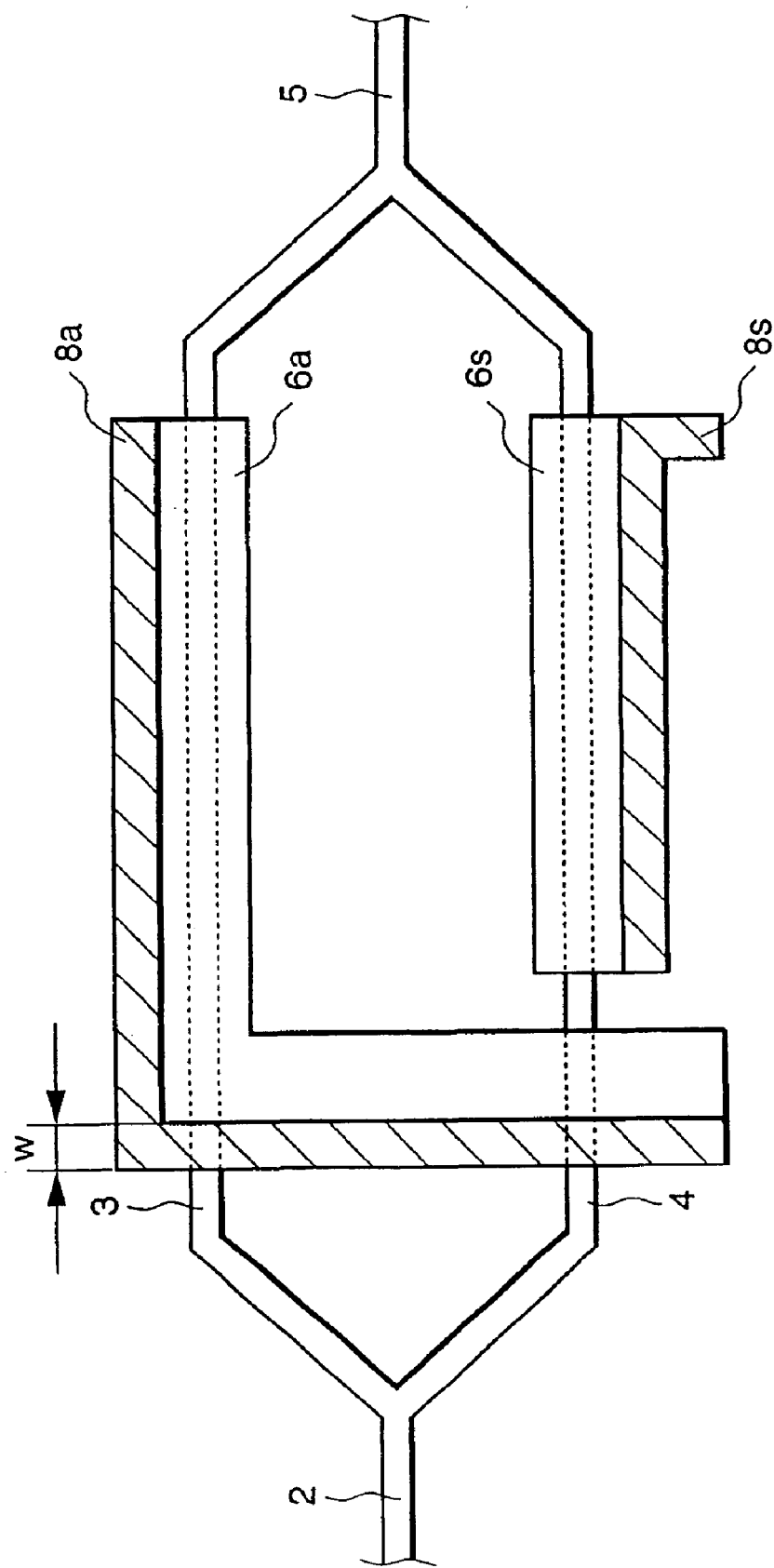
FIG. 18 is a sectional view showing an embodiment where a part of a metal film may cross an optical waveguide.

FIG. 18 is an embodiment where a part of metal film crosses over optical waveguides. Further concretely, while the conductive transparent film 6*a* is formed so that the conductive transparent film 6*a* may cross over the optical waveguides 3 and 4, further, the metal film 8*a* is also formed on conductive transparent film 6*a* so that the metal film 8*a* may cross over the optical waveguides 3 and 4. Although light is absorbed by the metal film 8*a* since the metal film 8*a* crosses over the optical waveguides 3 and 4, it can be substantially used practically if the width w of the metal film that crosses over the optical waveguides is sufficient narrow to the length of the optical waveguides. Here, the sufficient narrow width means such width that a degree of apart of the metal film 8*a* absorbing light passing through the optical waveguides 3 and 4 meets a system requirement.

Figure 19:
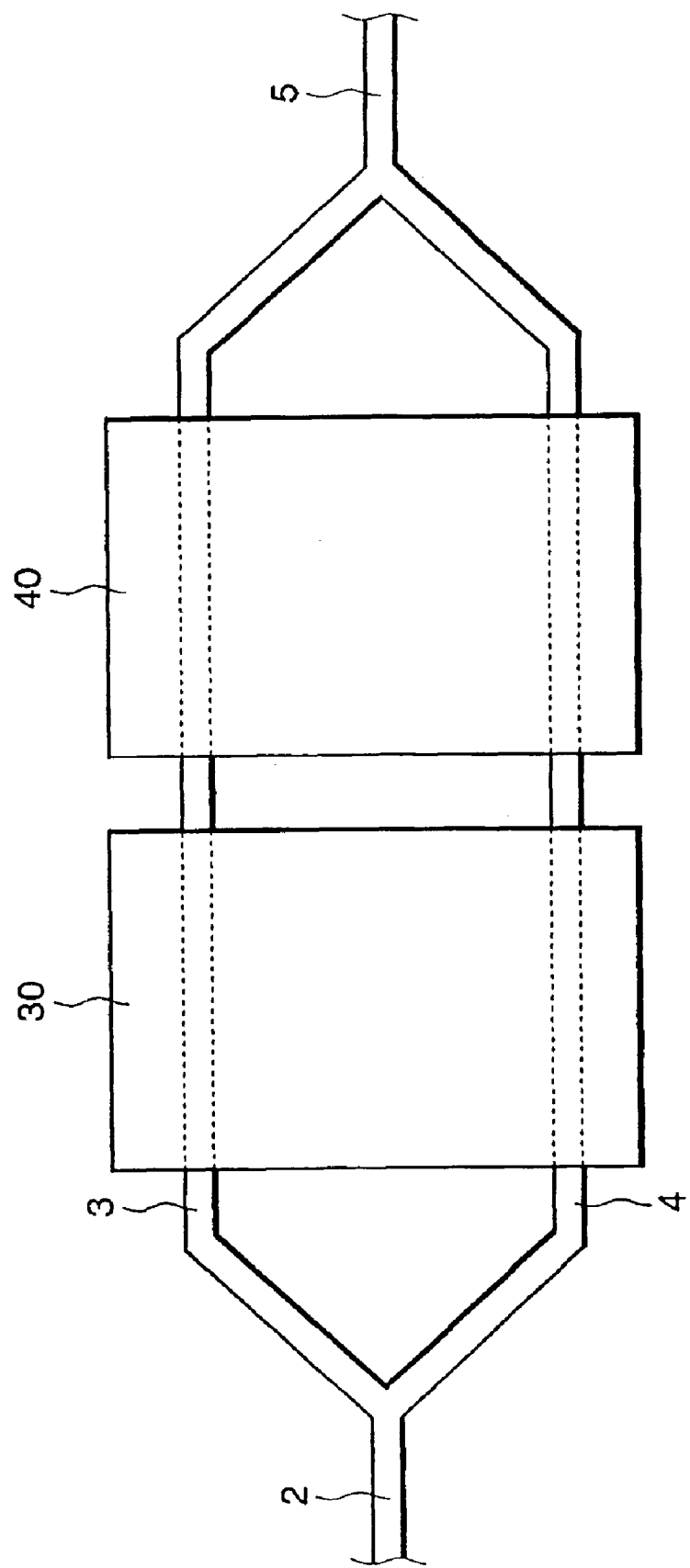
FIG. 19 is a top view showing a case where any one of the embodiments of the present invention is adopted in the structure of at least one electric field application unit in a Mach-Zehnder type optical modulator.

FIG. 19 is another embodiment of an optical waveguide device equipped with a plurality of optical waveguides. A first electric field generating unit 30 and a second electric field generating unit 40 are shown in the figure. The above-mentioned embodiment is applicable to at least one of these first electric field generating unit 30 and second electric field generating unit 40. In particular, when applying the above-described embodiment only to the one unit, conventional electrode arrangement can be applied to another unit. Of course, it is also possible to apply the above-mentioned embodiment to both of the first electric field generating unit 30 and the second electric field generating unit 40.

As described above, by forming metal electrodes in other portions except portions formed on optical waveguides in transparent electrodes, it becomes possible to prevent optical loss and to perform high-speed modulation. Of course, although a part of the metal electrode may be arranged with being superimposed on the parts formed on the optical waveguides in a transparent electrode, it is desirable to limit a degree of superposition to a minimum necessary degree without performing full superimposition as in a conventional way.

In addition, it is possible to prevent optical loss and to achieve further high-speed modulation by forming a metal electrode so that the metal electrode may not be superimposed as much as possible on the parts formed on the optical waveguides in the transparent electrodes.

As mentioned above, although various embodiments of an optical waveguide device are explained, it can be understood by a skilled in the art that an optical modulator and an optical communication apparatus may be constituted by adopting the above-mentioned embodiments.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A device for modulating light emitted by a laser, comprising:
    an optical substrate that has an electro-optical effect;
    a first optical waveguide formed near a front face of the optical substrate;
    a first electrode that is formed with a conductive transparent film so that a part of the first optical waveguide is covered and is used for applying an electric field to the first optical waveguide;
    a second optical waveguide formed near a front face of the optical substrate;
    a second electrode that is formed with a conductive transparent film so that a part of the second optical waveguide is covered and is used for applying an electric field to the second optical waveguide;
    a third electrode that is paired with the first electrode and the second electrode and is used for applying an electric field which has correlation to the first optical waveguide and the second optical waveguide respectively;
    a fourth electrode that is formed with a metal film in a position which is shifted from a position just above the first optical waveguide and is electrically connected with the first electrode;
    a fifth electrode that is formed with a metal film in a position that is shifted from a position just above the second optical waveguide and is electrically connected with the second electrode; and
    a conductive transparent film, having thickness thinner than the conductive transparent film which constitutes the first electrode, between the first electrode and the second electrode.

2. An optical modulator, wherein the device according to claim 1 is used.

3. An optical communication apparatus, wherein the device according to claim 1 is used.

4. A device for modulating light emitted by a laser, comprising:
    an optical substrate that has an electro-optical effect;
    a first optical waveguide formed near a front face of the optical substrate;
    a first electrode that is formed with a conductive transparent film so that a part of the first optical waveguide is covered and is used for applying an electric field to the first optical waveguide;
    a second optical waveguide fanned near a front face of the optical substrate;
    a second electrode that is formed with a conductive transparent film so that a part of the second optical waveguide is covered and is used for applying an electric field to the second optical waveguide;
    a third electrode that is paired with the first electrode and the second electrode and is used for applying an electric field which has correlation to the first optical waveguide and the second optical waveguide respectively;
    a fourth electrode that is formed with a metal film in a position which is shifted from a position just above the first optical waveguide and is electrically connected with the first electrode;
    a fifth electrode that is formed with a metal film in a position that is shifted from a position just above the second optical waveguide and is electrically connected with the second electrode; and
    a conductive transparent film, having thickness thinner than the conductive transparent film which constitutes the first electrode, between the first electrode and the third electrode.

5. An optical modulator, wherein the device according to claim 4 is used.

6. An optical communication apparatus, wherein the device according to claim 4 is used.

7. A device for modulating light emitted by a laser, comprising:
    an optical substrate that has an electro-optical effect;
    a first optical waveguide formed near a front face of the optical substrate;
    a first electrode that is formed with a conductive transparent film so that a part of the first optical waveguide is covered and is used for applying an electric field to the first optical waveguide;
    a second optical waveguide fanned near a front face of the optical substrate;
    a second electrode that is formed with a conductive transparent film so that a part of the second optical waveguide is covered and is used for applying an electric field to the second optical waveguide;
    a third electrode that is paired with the first electrode and the second electrode and is used for applying an electric field which has correlation to the first optical waveguide and the second optical waveguide respectively;

a fourth electrode that is formed with a metal film in a position which is shifted from a position just above the first optical waveguide and is electrically connected with the first electrode; and a fifth electrode that is formed with a metal film in a position that is shifted from a position just above the second optical waveguide and is electrically connected with the second electrode;

wherein a part of a metal film that constitutes the third electrode is formed so that the part of the metal film crosses over the first and second optical waveguides.

8. A device according to claim 7, wherein a part of a metal film which constitutes the third electrode is a metal film whose width is sufficiently narrow relative to length of the first and second optical waveguides.

9. A device according to claim 8, wherein the sufficiently narrow width means such width that a degree of a part of the metal film absorbing light passing through the optical waveguides meets a system requirement.

10. An optical communication apparatus, wherein the device according to claim 7 is used.

11. An optical modulator, wherein the device according to claim 7 is used.

* * * * *

UNITED STATES PATENT AND TRADEMARK OFFICE
CERTIFICATE OF CORRECTION

PATENT NO. : 6,853,757 B2
DATED : February 8, 2005
INVENTOR(S) : Minoru Seino

It is certified that error appears in the above-identified patent and that said Letters Patent is hereby corrected as shown below:

Column 5,
Line 60, replace "few" with -- little --.

Column 6,
Line 41, replace "few" with -- little --.

Signed and Sealed this

Seventh Day of March, 2006

JON W. DUDAS
*Director of the United States Patent and Trademark Office*